Sept. 14, 1965  C. KOJABASHIAN ETAL  3,205,825
PROPORTIONING PUMP
Filed Nov. 18, 1963
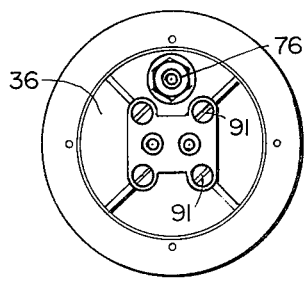
FIG. 3
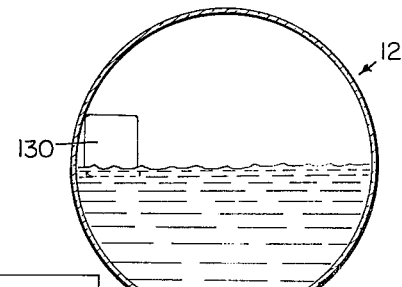
FIG. 1
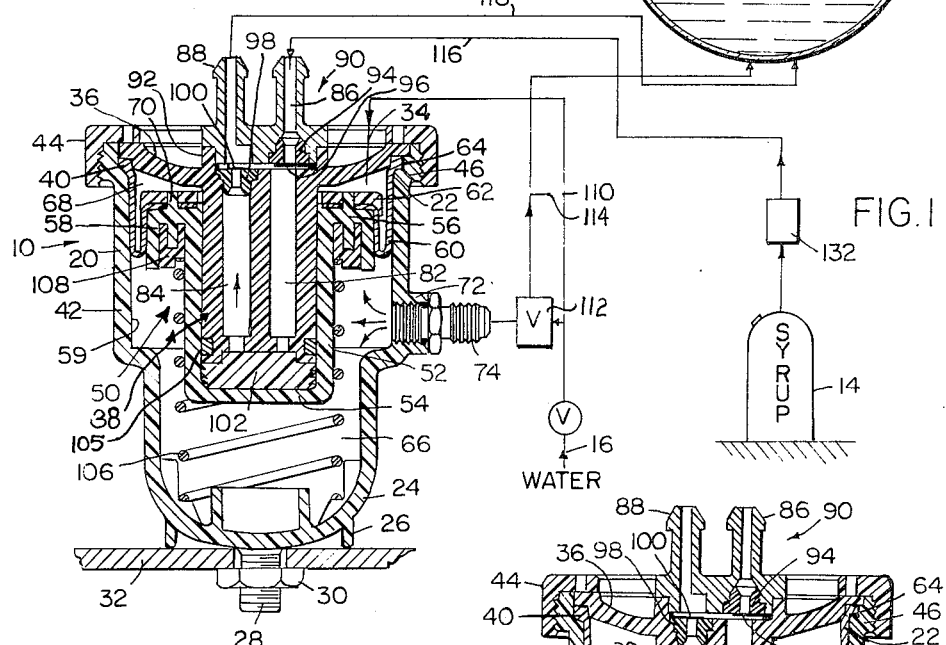
FIG. 2
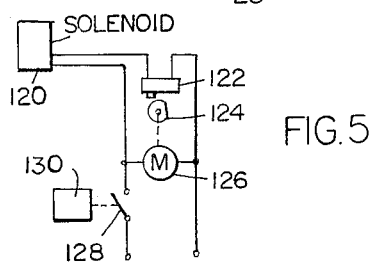
FIG. 5
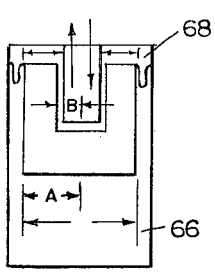
FIG. 4
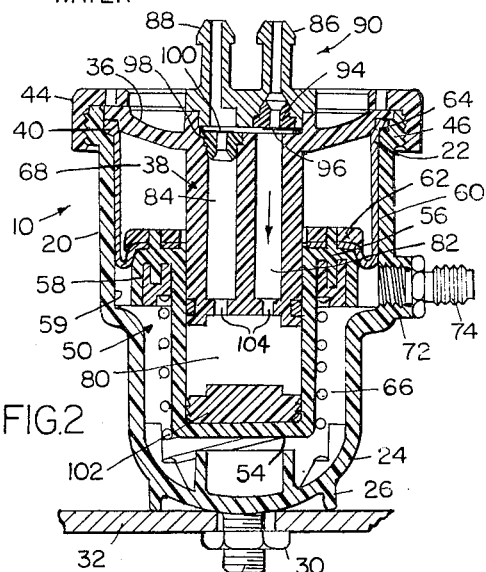
INVENTORS
CHARLES KOJABASHIAN
JOHN S. HOWLAND
BY
Ezekiel Wolf, Wolf & Greenfield
ATTORNEYS United States Patent Office 3,205,825
Patented Sept. 14, 1965

3,205,825
PROPORTIONING PUMP
Charles Kojabashian, 362 Peakham Road, Sudbury, Mass., and John S. Howland, 85 Duff St., Watertown, Mass.
Filed Nov. 18, 1963, Ser. No. 324,380
9 Claims. (Cl. 103—50)

This invention relates to proportioning devices and more particularly comprises a new and improved proportioning device for precisely controlling the ratio of volumes of two liquids moving in a system.

Most devices for controlling the ratio of liquids in a system are affected by one or more of the characteristics of the liquids being metered such as temperature, pressure and viscosity. As a result, most proportioning devices are not capable of dependably metering liquids in selected ratios and therefore are not suitable for use in systems where consistent accurate proportioning is essential. Beverage dispensers which combine water and flavor syrup are a typical example of devices which require the metering of two liquids with an accuracy not attainable from most proportioning devices. It is apparent that the viscosity of flavor syrups vary widely and the pressure and temperature of the water source varies from time to time in any specific location and from one location to another. Accordingly quality beverage dispensers cannot tolerate the variations in control provided by the typical proportioning devices now available.

Such machines as beverage dispensers and others which handle food and drink also require proportioning devices that may be cleaned quickly and thoroughly. Thus, a device which cannot be opened or easily disassembled for cleaning is not acceptable.

Metering accuracy and the ease with which the proportioning device may be cleaned are but two of many important considerations which served as a guide in the development of the present invention. Such factors as cost, size, safety and versatility were also considered in the development.

The general object of this invention is to provide a proportioning decide which gives accurate and consistent performance regardless of temperature, pressure and viscosity of the liquids being metered.

Another important object of this invention is to provide a proportioning device which may be completely disassembled and cleaned without difficulty.

Another important object of this invention is to provide a proportioning device which is relatively inexpensive to manufacture.

Yet another important object of this invention is to provide a proportioning device which is free of external seals so as to minimize the opportunity for leakage, is virtually tamper-proof and accordingly once set cannot be varied by the operator, is completely safe in its operation and is not sensitive to its specific orientation in a system so that it can function without regard to how it is mounted.

To accomplish these and other objects the proportioning device of this invention includes among its features a housing open at one end and closed at the other. A post extends into the housing from the open end and terminates short of the closed end. A piston is slidably mounted on and extends about the inner end of the post and cooperates with the post to define a metering chamber within the housing about that end of the post. A flexible diaphragm connects the piston with the housing and defines with the housing a metering compartment. Openings are provided in the housing wall for separately directing the two fluids to be metered into the metering chamber and compartment. The position of the piston in the housing controls the volume of the metering chamber and metering compartment, and the piston serves as a positive displacement pump to alternately discharge the liquids in the chamber and compartment into a container.

These and other objects and features of this invention will be better understood and appreciated from the following detailed description of one embodiment thereof, selected for purposes of illustration and shown in the accompanying drawing, in which:

FIG. 1 is a diagrammatic view of a beverage dispenser constructed in accordance with this invention, and includes therein the proportioning device of this invention shown in section;

FIG. 2 is a cross-sectional view of the proportioning device of FIG. 1 but showing its moving parts in a different position;

FIG. 3 is a top view of the proportioning device shown in FIGS. 1 and 2;

FIG. 4 is a diagrammatic view of the proportioning device presented to aid in the understanding of its operation; and FIG. 5 is a schematic diagram of a simple control circuit for a valve in the dispenser of FIG. 1.

The beverage dispenser shown in FIG. 1 includes in its general organization a proportioning device 10, a beverage reservoir 12 in which the liquids are combined and from which the prepared drink is discharged, a flavor syrup supply container 14 and a connection 16 to a source of water. The water source is ordinarily either city water or a water tank. The proportioning device 10 constitutes the heart of the dispensing system shown and it will be described with reference to its performance in the system. It is to be understood however that the proportioning device has many other applications, and the beverage dispensing art is merely typical of the wide variety of applications for which it is suited.

The proportioning device 10 includes a housing 20 which is generally cylindrical in shape, is open at its upper end 22 as viewed in FIG. 1 and is closed at its lower end 24 by a substantially hemispherical wall formed as an integral part of the housing. A collar 26 extends downwardly from the wall 24 to form a stand for the housing 20, and a threaded stud 28 is aligned axially with the collar 26 and cooperates with a nut 30 to retain the housing 20 firmly on a support 32.

The open end 22 of the housing 20 is closed by an end member 34 which includes a dish-shaped end wall 36 and a centrally located post 38 which extends into the housing 20 toward the closed hemispherical wall 24. The member 34 is oriented with the periphery of the dish-shaped wall 36 seated on a shoulder 40 provided in the end of the cylindrical wall 42 of the housing, and the member is held in place by a closure ring 44 threaded onto the externally threaded section 46 of the wall 42.

A piston 50 having a cylindrically shaped central portion defined by a cylindrical wall 52 and an end wall 54 is slidably mounted on the post 38 and is capable of moving between the extreme positions substantially shown in FIGS. 1 and 2. The piston 50 has an outwardly extending flange 56 at its upper end which terminates in a down-turned skirt 58 spaced a short distance from the inner surface 59 of the wall 42 of the housing. A diaphragm 60 is secured by a sealing ring 62 to the upper surface of the flange 56, and the outer peripheral edge 64 of the diaphragm is seated on the shoulder 40 and held in place by the periphery of the dish-shaped wall 36 beneath the ring 44. A plurality of upwardly extending pins 70 formed as an integral part of the flange 56 cooperate with the sealing ring 62 to retain the inner edge of the bellows on the flange. The diaphragm 60 and the piston 50 divide the inside of the housing 20 into a pair of non-communicating compartments 66 and 68. As will be evident below, the compartment 66 beneath the diaphragm and piston serves as a metering compartment to control the volume of flow of water to the container or reservoir 12.

An internally threaded opening 72 formed in the cylindrical wall 42 of the housing provides access to and from the metering compartment 66. A connector 74 is screwed into the opening 72 to provide a fitting for the attachment of the necessary hose. A similar connector 76 is threaded into the dish-shaped end wall 36 of the member 34 and provides access to and from the other compartment 68 in the housing above the piston and diaphragm.

The central cylindrical portion of the piston 50 defined by the cylindrical wall 52 and the end wall 54 cooperates with the post 38 of the member 34 to define a metering chamber 80 for the syrup to be supplied to the reservoir 12 (see FIG. 2). Access to the chamber 80 is provided by a pair of passages 82 and 84 formed in the post and which are in turn connected to a pair of passages 86 and 88 in the syrup manifold 90. The lower end of the manifold 90 is secured by screws 91 onto an upstanding collar 92 on the outer surface of the end wall 36, and its passages 86 and 88 are in alignment with the two passages 82 and 84 in the post. A check valve seat 94 is provided in the lower end of the passage 86 of the manifold and cooperates with a check valve 96 to limit flow through the passage 86 in a direction into the passage 82 and the metering chamber 80. A second check valve seat 98 is disposed in the upper end of the passage 84 in the post and cooperates with a check valve 100 to limit flow through the passages 84 and 88 in a direction out of the metering chamber 80. In FIG. 1 it will be noted that the passage 86 of the manifold 90 is connected to the syrup tank 14 while the passage 88 in the manifold is connected to the reservoir 12.

A seal 102 is carried within the cylindrical portion of the piston on its end wall 54, which serves to close the orifices 104 that connect the passages 82 and 84 in the post to the metering chamber 80. When the piston 50 is in the elevated position shown in FIG. 1 the seal 102 bears against the end of the post and completely closes the orifices. An O-ring seal 105 surrounds the lower end of the post 38 and bears against the inner surface of the cylindrical wall 52 of the piston 50 to form a seal between the chamber 80 and the compartment 68. Therefore, as the piston moves up and down in the housing no leakage occurs between the compartment 68 and the metering chamber 80 to cause mixing of the water and the syrup and adversely affect the accuracy of the device.

A spring 106 is disposed in the metering compartment 66 and bears against the inner surface of the wall 24 of the housing and the filler ring 108 mounted between the skirt 58 of the piston and the outer surface of the piston cylindrical wall 52. The spring 106 urges the piston 50 to the elevated position shown in FIG. 1, and is provided primarily to overcome the friction in the system when the piston is in the lower position shown in FIG. 2. As will become evident below the spring 106 is not an essential part of this invention but is provided to quicken the response of the piston to large forces applied to its lower surface.

The diagrammatic representation of the metering device shown in FIG. 4 is presented to aid in the understanding of the operation of the device. It will be noted upon an examination of the proportioning device that the exposed areas of the piston 50 in the compartments 66 and 68 are unequal. The area of the piston exposed to the compartment 68 is less than the area exposed to the compartment 66 by an amount equal to the area of the post 38. Thus the area of the piston exposed to the compartment 66 is shown in FIG. 4 to be $\pi A^2$, and the area exposed to the compartment 68 is $\pi A^2 - \pi B^2$. Consequently, if the chambers 66 and 68 are filled with liquids of equal pressure, the piston will move upwardly in the housing to the position shown in FIG. 1. Thus, if the connectors 74 and 76 are placed in communication with the same source of water under pressure, the piston will seek the position shown in FIG. 1 and the chamber 66 will fill with water. When the piston is in the elevated position shown in FIG. 1 the volume of the metering chamber 80 is zero, and any liquid previously in that chamber is discharged through the passages 84 and 88. However, when the force applied to the piston from the chamber 68 exceeds the force applied from compartment 66, the piston moves to the lower position shown in FIG. 2, the volume of the compartment 66 decreases and accordingly the liquid in that compartment discharges through the connector 74. Simultaneously the volume of the metering chamber 80 increases to allow it to receive syrup from the tank 14.

FIG. 1 which illustrates the several connections between the metering device 10, the beverage reservoir 12, the syrup tank 14, and the water source 16, suggests that the water source 16 is connected by a duct 110 directly to the connector 76 of the compartment 68 and through a two-position solenoid valve 112 to the connector 74 of metering compartment 66. As described in detail below in connection with the operation of the system, the valve 112 in one position connects the conduit 110 to the connector 74 to allow water to flow from the source 16 into the compartment 66, and in its other position the valve 112 allows the contents of the compartment 66 to discharge through connector 74 into the duct 114 which leads to the beverage reservoir 12. The syrup tank is connected by a duct 116 to the inlet passage 86 of the manifold 90, and duct 118 connects the outlet passage 88 of the manifold to the reservoir 12.

In FIG. 5 a simple circuit for controlling operation of the valve 112 is shown. The circuit includes the solenoid 120 of the valve 112 connected through a switch 122 to 110 volt A.-C. source. The switch 122 is controlled by a cam 124 which may be driven by a clock-type motor 126 connected across the line. When the solenoid 120 is de-energized the valve 112 is in its normal position providing communication between the inlet line 110 and the connector 74. Upon energization of the solenoid 120 the valve position changes to interconnect the connector 74 and the discharge line 114. An override switch 128 may be connected in the line, which is controlled by a float control 130 in the reservoir 12. When the float 130 determines that no more liquid is to be supplied to the reservoir 12 it opens the switch 128 to maintain the solenoid 120 in its de-energized condition regardless of the position of the switch 122 controlled continuously by the motor driven cam 124. The overriding switch 128 may also be opened by a device in line 116, which senses when the syrup tank 14 is empty.

The metering device 10 operates in the system of FIG. 1 as follows: Assume that the float valve 130 calls for a beverage to be supplied to the reservoir 12 so that the overriding switch 128 is closed. Before the demand for liquid occurs the switch 128 will be open and the solenoid 120 will be de-energized so that the valve 112 places the duct 110 in communication with the compartment 66. Thus, in the "down" condition, the piston 50 will occupy the position shown in FIG. 1, and the metering chamber 80 will be empty. The metering compartment 66 connected to the source of water will be filled and the valve 112 will prevent it from being discharged into the reservoir 12. With the call for beverage in the reservoir 12, during the first cycle of the timer motor 126 the cam 124 closes the switch 122 and the solenoid 120 is energized so that the valve 112 connects the connector 74 to the duct 114. Consequently the pressure of the water line 16 transmitted through the duct 110 exerts a greater force against the upper surface of the piston 50 imposed in the chamber 68 than is exerted against the lower surface of the piston, and this condition causes the piston to move downwardly toward the position shown in FIG. 2. As the piston moves downwardly the contents of the compartment 66 discharge through the duct 114 into the reservoir 12, and simultaneously the metering chamber 80 enlarges and syrup is drawn into it from the tank 14 through the duct 116 and the passages 86 and 82. It should be noted that the syrup tank 14 is normally at the same pressure as reservoir 12, is disposed below the height of the pump housing 10, and the housing 10 is below the height of the reservoir to prevent improper action of the check valves. Movement of the piston 50 continues in a downward direction until the motor cam reopens the switch 122 to de-energize the solenoid. De-energization of the solenoid again places the compartment 66 in communication with the water source, and the greater force exerted upon the lower surface of the piston causes it to rise on the post 38 and contract the chamber 80. Thus, the syrup in the metering chamber 80 is discharged through the passages 84 and 88, the duct 118 and into the reservoir 12. The water in the compartment 68 is forced back into the line 110. From the foregoing it is seen that during the downward stroke of the piston 50 water is supplied to the reservoir 12, and during the upward stroke of the piston syrup is supplied to the reservoir.

In actual use the timer cycle may be set to change the position of the valve 112 every five seconds. It will be apparent that regardless of the duration of each cycle, the ratio of the water and syrup supplied to the reservoir 12 will remain the same; that is the ratio will remain the same whether the stroke of the piston 50 extends to the lowermost position shown in FIG. 2 or the stroke is somewhat shorter. As the length of the pumping stroke is the same in discharging the liquid from both the metering compartment 66 and the metering chamber 80, the volumetric ratio of the two compartments is proportional to their cross-sectional areas which are constant.

The foregoing description of the metering device 10 and the system in which it is used in the illustrative embodiment will make many of the advantages of this invention apparent to one having ordinary skill in this art. A very important advantage of the metering device is its ability to consistently provide a fixed ratio of liquids delivered to the reservoir. The volume of each liquid and their ratio is in no way affected by temperature, pressure or viscosity. Further, the moving parts of the metering device are confined within the housing, and no seals are required in the exterior walls through which leakage may occur. The device may readily be disassembled for cleaning by unscrewing the ring 44, and all of the parts may be made of a plastic material which will not corrode and which is easy to clean. Therefore the highest standards of cleanliness may be observed. The ratio of volumes is fixed and cannot be changed without changing the piston and member 34. As a result, the proprietor of an establishment using a dispenser incorporating the metering device 10 cannot conveniently dilute the drinks in an effort to save on the cost of the syrup used. Further, the metering device may serve as an alarm to detect when the pressure in the reservoir 12 exceeds a set value. If the pressure in the tank or reservoir 12 (which may intentionally be kept under slight pressure) exceeds the pressure of the water source 16 the piston 50 will not move downwardly on the post to expel the water in the compartment 66 into the reservoir 12, and accordingly further cycling of the valve 112 will not cause corresponding changes in the position of the piston. Rather, the piston will remain in the position shown in FIG. 1 until the pressure of the water source again exceeds the pressure in the tank 12. As yet another important advantage, the system shown in FIG. 1 is controlled by a single valve 112. When that valve stops operating no further liquid is conveyed to the reservoir 12 and complete shut-down results.

Another important advantage of the metering device 10 is its ability to operate in virtually any position. Thus, if the housing 20 is mounted with its axis arranged horizontally, it will continue to perform the function of metering the volume of the two liquids. It is in no way dependent upon gravity for its operation nor its position with respect to the reservoir 12, syrup tank 14 and water supply 16. As yet another advantage, the metering compartment 66 is self purging. It will be noted in FIG. 2 that at the end of the stroke of the piston 50 the connector 74, through which the contents of the chamber 66 is discharged, is located at the very top of the compartment and accordingly any air trapped in the system will discharge through the duct 114. This is a characteristic of the device whether it is mounted in the position shown in the drawings or in a horizontal position with the connector 74 at the top.

From the foregoing description those skilled in the art will appreciate that numerous modifications may be made of this invention without departing from its spirit. Therefore it is not intended that the breadth of this invention be limited to the specific embodiment illustrated and described. Rather, it is intended that the scope of this invention be limited by the appended claims and their equivalents.

What is claimed is:

1. A proportioning pump comprising
a generally cylindrical housing closed at one end,
a generally cylindrical post extending into the housing from its other end and oriented with its axis parallel to the housing axis, said post having an inner end which terminates short of the closed end of the housing,
a piston slidably mounted on the post and having a central portion which covers the end of the post, said portion and post cooperating to define a chamber within the housing which varies in volume with movement of the piston on the post,
a diaphragm secured to the piston and the housing and cooperating with the piston to divide the interior of the housing into two compartments,
inlet and outlet passages provided in the post and communicating with the chamber from outside the housing,
and means for directing fluid under pressure into and out of each of the two compartments.

2. A proportioning pump as defined in claim 1 further characterized by
said piston being slidable on the post in response to opposed forces of different magnitude applied to the piston by the fluid in the two compartments.

3. A metering pump comprising
a pump housing,
a post disposed in the housing and having an end spaced an appreciable distance from one end of the housing,
a cup-shaped piston slidably mounted on the post and cooperating with the post to define a metering chamber in the housing,
a flexible diaphragm connected between the piston and the housing and cooperating with the housing and piston to define a metering compartment in the housing,
means defining openings in the housing for directing fluids to be metered into and out of the metering chamber and compartment,
and means for moving the piston on the post, 4. A meter pump as defined in claim 3 further characterized by the last-named means including,
a second compartment in the housing,
and means for supplying fluid under pressure to the two compartments.

5. A proportioning pump comprising
a generally cylindrical housing,
means for closing one end of the housing,
a post extending into the housing from the other end generally parallel to the axis of the housing and terminating short of the closed end of the housing,
a cover closing the other end of the housing and supporting the post in the housing, a piston slidably mounted on the post and having a cylindrical portion which extends about the terminal end of the post and which defines with the post a metering chamber, said chamber enlarging in volume as the piston moves on the post toward said one end of the housing and diminishing in volume as the piston moves in the other direction on the post, flexible means secured between the piston and the housing for dividing the housing into a first compartment on the same side of the piston as the chamber and a metering compartment on the other side of the piston, said first compartment enlarging in volume and the metering compartment diminishing in volume as the piston moves toward said one end of the housing and said piston oppositely effecting the volumes of the compartments when the piston moves in the other direction, means connected to the chamber for directing one liquid to the chamber when the chamber increases in volume and discharging liquid from the chamber when the chamber diminishes in volume, means for directing a second liquid to the first compartment, feeding means for directing the second liquid to the metering compartment under the same pressure as it is directed to the first compartment, discharge means for discharging liquid from the metering compartment, and means for alternately operating feeding means and the discharge means.

6. A proportion pump as defined in claim 5 further characterized by said post diminishing the effective area of the piston on the side of the chamber and first compartment whereby said piston moves in said other direction when the first and metering compartments are simultaneously fed the second liquid.

7. A proportioning pump as defined in claim 6 further characterized by the means connected to the chamber including an inlet and an outlet passage extending through the post, and check valves in the passages controlling the direction of flow through the passages.

8. A metering pump comprising
a pump housing,
a post disposed in the housing and having an end spaced an appreciable distance from one end of the housing,
a piston slidably mounted on and enclosing the end of the post and cooperating with the post to define a metering chamber within the housing,
a metering compartment provided within the housing and defined in part by the piston and housing,
means defining openings in the housing for directing fluids to be metered into and out of the metering chamber and compartment,
and means for moving the piston on the post.

9. A metering pump comprising
a pump housing,
a post disposed in the housing and having an end spaced from one end of the housing,
piston means slidably mounted on and enclosing the end of the post and cooperating with the post to define a metering chamber within the housing, said piston means engaging the housing and cooperating with the housing to define a metering compartment in the housing,
means defining openings in the housing for directing fluids to be metered into and out of the metering chamber and compartment,
and means for moving the piston means on the post.

References Cited by the Examiner

UNITED STATES PATENTS

| 1,391,676 | 9/21 | Finley | 103—7 X |
| 1,842,430 | 1/32 | Spohr | 103—158 X |
| 2,866,415 | 12/58 | Montelius | 103—158 X |
| 3,068,798 | 12/62 | Machen | 103—9 X |

LAURENCE V. EFNER, *Primary Examiner.*

ROBERT M. WALKER, *Examiner.*